UNITED STATES PATENT OFFICE.

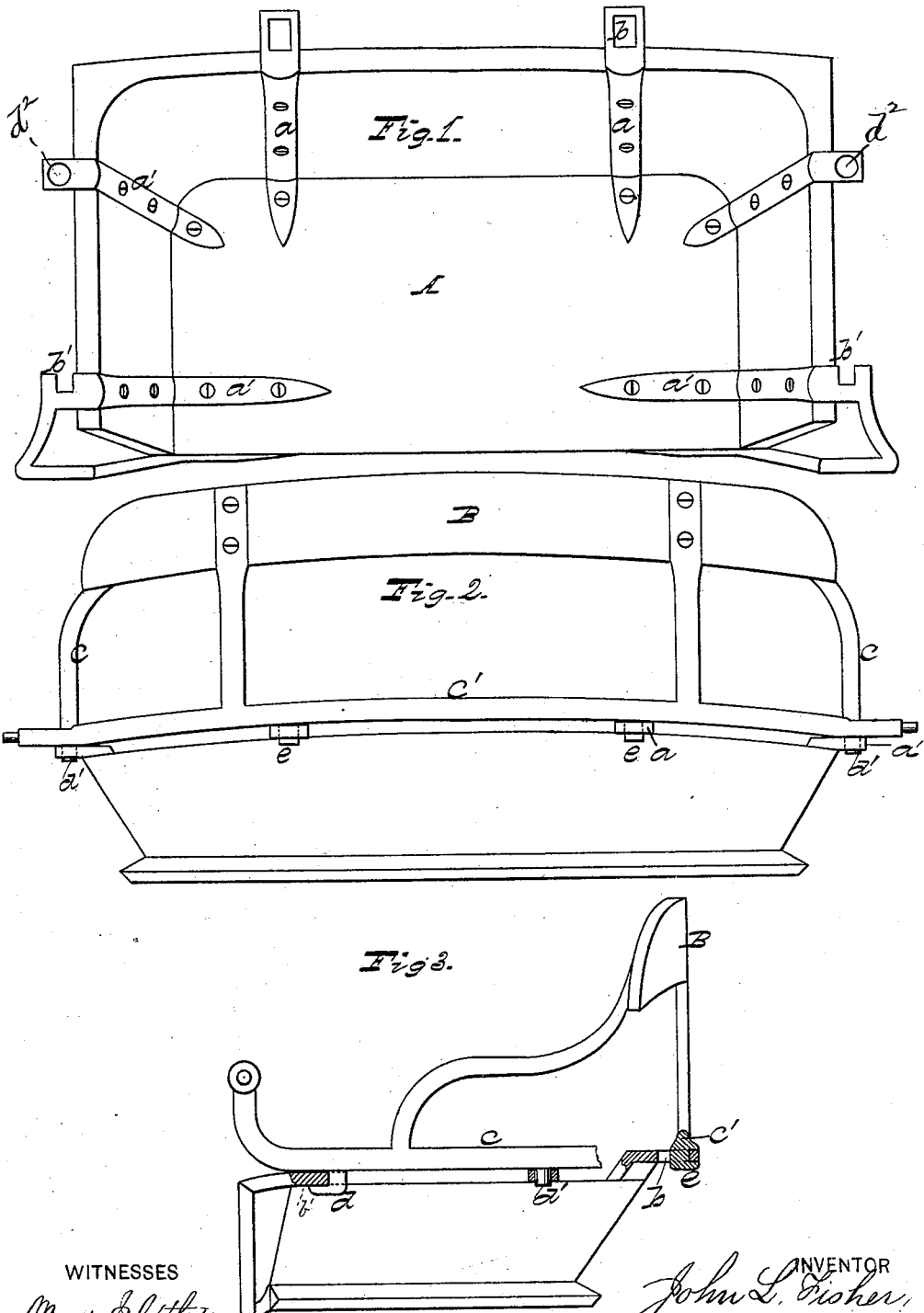

JOHN L. FISHER, OF WHITE WATER, WISCONSIN, ASSIGNOR OF ONE-HALF OF HIS RIGHT TO EDWARD MONTAGUE WILCOX, OF SAME PLACE.

IMPROVEMENT IN SHIFTING-RAILS FOR VEHICLES.

Specification forming part of Letters Patent No. 221,295, dated November 4, 1879; application filed April 21, 1879.

*To all whom it may concern:*

Be it known that I, JOHN LESLIE FISHER, of White Water, in the county of Walworth and State of Wisconsin, have invented a new and valuable Improvement in Shifting-Rails for Vehicles; and I do hereby declare that the following is a full, clear, and exact description of the construction and operation of the same, reference being had to the annexed drawings, making a part of this specification, and to the letters and figures of reference marked thereon.

Figure 1 of the drawings is a representation of my improved shifting-rail for vehicles with the seat-back removed, in plan view. Fig. 2 is a rear view thereof; and Fig. 3 is a side elevation of the same, partly in section.

This invention relates to certain improvements in shifting-rails for vehicles, the object of which is to provide for easily and quickly connecting and disconnecting the back-rail of the seat; and the nature of the invention consists in constructing the back-rail with front and rear hooks, adapted to be sprung and locked into catches or eyes connected to the seat, and held in place by intermediate stop-projections and engaging-studs, substantially as hereinafter more fully set forth.

In the accompanying drawings, A marks the seat, with its parts fastened together by irons or braces $a\ a'$, in the usual manner. The upper ends of the rear braces or irons are provided with projecting staples or eyes $b\ b$, and the front-side braces with notches $b'$.

B is the back-rail of the seat, having the arm or side pieces, $c\ c$, connected to a spring-bar, $c'$, of the back-rail.

The arms or side bars, $c$, and the spring-bar $c'$ are provided (the former at their forward ends) with forwardly-projecting hooks $d$, fitting into the notches $b'$ at that end of the seat, and at their rear ends with downwardly-projecting studs $d'$, entering locking eyes or staples $d^2$ on the seat, or rather in its braces, while the spring-bar $c'$ is provided with rearwardly-projecting hooks $e\ e$, fitting into eyes or staples $b$ in the back-braces of the seat.

To disconnect the back-rail B of the seat, press at the points of connection in rear inwardly upon the spring-bar $c'$, and as the hooks $e\ e$ come in a line with their eyes or staples, lift the back-rail, then move the latter rearwardly, when its other hooks will be disengaged from their notches or catches, allowing it to be removed.

The method of again uniting the back-rail to the seat is effected by simply inserting its forward hooks, $d$, in their notches or catches $b'$, which will bring their studs $d'$ in line with their coincident eyes or staples, and then pressing upon the spring-bar $c'$, as before, until the rear hooks, $e$, are in line with their eyes or staples, the latter hooks, with a slight downward pressure or movement of the rail, will spring into and be locked in their eyes or staples, thus firmly and securely locking the back-rail in position.

As the spring-pressure of the bar $c'$ is outward, or in the same direction as that which may be exerted by the occupant of the seat, there is little or no liability to accidental disengagement.

I am aware that a spring shifting-rail adapted to be attached to a buggy-body is not new; hence I make no broad claim to such invention.

Having thus fully described my invention, I claim and desire to secure by Letters Patent—

The combination, with the seat, having the rear eyes, $b$, front notches, $b'$, and stop-perforations $d^2$ between the same, of the seat-back rail, having the spring-bar $c'$, provided with rearward hooks, $e$, passing through the eyes $b$, forward hooks, $d$, engaging with the front notches, $b'$, and locking-studs $d'$, engaging with the stop-perforations $d^2$, and preventing forward or rear movement of the rail after it is sprung into position, substantially as specified.

In testimony that I claim the above I have hereunto subscribed my name in the presence of two witnesses.

JOHN LESLIE FISHER.

Witnesses:
 E. M. WILCOX,
 J. A. PARTRIDGE.